United States Patent Office 3,275,627
Patented Sept. 27, 1966

3,275,627
6-MORPHOLINO-2,2,4 TRILOWERALKYL-1,2 DIHYDROQUINOLINES
Ning Jo Chu, McMasterville, Quebec, Canada, assignor to Canadian Industries Limited, Montreal, Quebec, Canada, a corporation of Canada
No Drawing. Filed Dec. 12, 1962, Ser. No. 243,999
Claims priority, application Great Britain, Jan. 2, 1962, 164/62
2 Claims. (Cl. 260—247.5)

This invention relates to new chemical compounds, and also to the incorporation of small amounts of these compounds with vulcanized rubbers in order to prevent or reduce the cracking and deterioration of said rubbers in the presence of ozone or oxygen.

It has long been known that rubbers such as natural rubber or styrene-butadiene rubbers suffer from surface cracking when flexed in the presence of ozone. Even the natural concentration of ozone in the atmosphere is sufficient to cause cracking of this type in the walls of car tires. It has thus become common practice to incorporate with the rubbers chemicals which inhibit this cracking, said chemicals being known as antiozonants. It is also known that rubbers suffer from attack by oxygen, particularly at elevated temperatures, and the chemicals incorporated with the rubbers to inhibit this attack are known as antioxidants.

It is an object of this invention to provide a new class of chemical compounds, which are effective rubber antioxidants and antiozonants. A further object is to provide rubbers of improved ozone and oxygen resistance which have incorporated therewith a small but effective amount of said compounds.

The new compounds of this invention are 6-morpholino-2,2,4-trialkyl-1,2-dihydroquinolines and they have the following formula:

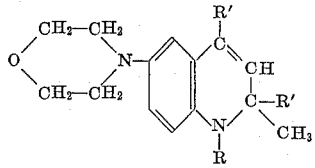

wherein R and R' represent an alkyl substituent such as methyl ethyl, propyl, isopropyl or butyl and R additionally may represent a hydrogen atom.

The 6-morpholino-2,2,4-trialkyl-1,2 - dihydroquinolines are suitably prepared by reacting p-chloronitrobenzene with at least one equivalent of morpholine at about 120° C.–150° C. The resulting nitro compound is hydrogenated using Adam's catalyst and hydrogen gas, or a metal-acid combination, to produce a substituted p-phenylenediamine. This latter compound is condensed with a ketone by heating with excess ketone in a pressure bottle on a steam bath for 18–24 hours in the presence of an iodine catalyst. Suitable ketones are acetone, 2-butanone, and 3-methyl-2-butanone. The excess ketone is distilled off to yield the compound of this invention. It is particularly important that the resulting compounds are crystalline solids in contrast to the 6-dialkyl amino derivatives which are dark coloured viscous oils. The solid material is much more easily purified and handled, and operators are more easily protected against the slight toxicity of the material. The substituent R can be further modified by reacting with an alkyl halide, suitably a lower alkyl iodide, to substitute the alkyl group for the hydrogen atom at the 1-position. The resulting compound within the class of this invention is a 6-morpholino-1,2,2,4-tetraalkyl-1,2-dihydroquinoline.

The antioxidants and antiozonants of this invention may be incorporated with rubbers in any known manner, such as by milling on a roll mill or Banbury mixer. They are most suitably incorporated in an amount ranging from 0.5% to 5% by weight of rubber, together with known fillers, stabilizers and vulcanizing agents, before the rubber is cured.

The following examples illustrate the invention but are in no manner to be contrued as limiting the scope thereof.

Example 1

One mole of p-nitrochlorobenzene (157.5 g.), was refluxed with one mole of morpholine (87 g.), and an excess of sodium carbonate for 3–4 hours (C. B. Kremer et al., J.A.C.S., 61, 2552 (1939)). This gave an almost quantitative yield of N-(p-nitrophenyl) morpholine (208 g.), which was reduced with Sn-HCl to give 160 g. of N-(p-aminophenyl) morpholine. Fifty grams of N-(p-aminophenyl) morpholine were heated under $N_2$ in a pressure bottle with 80 ml. of acetone and 1 g. of iodine for 20 hours. Evaporating off the excess acetone gave a dark coloured tar which was exhaustively extracted with boiling petroleum ether (B. 60–110° C.). A yield of 33–40 g. (45–55%) of 6-morpholino-2,2,4-trimethyl dihydroquinoline was obtained as pale-yellow crystals, M.P. 100–103° C.

Example 2

Samples of 6-morpholino-2,2,4-trimethyl-1,2-dihydroquinoline were incorporated in two white tire sidewall rubber mixes and tested for ozone resistance in comparison with similar mixes containing no antiozonant.

| Natural rubber mix | Parts by weight | S.B.R. rubber mix | Parts by weight |
|---|---|---|---|
| Pale crepe | 100 | Styrene-butadiene rubber | 100 |
| Stearic acid | 1.0 | Stearic acid | 1.0 |
| Zinc oxide | 25 | Zinc oxide | 70 |
| $TiO_2$ | 50 | Filler | 15 |
| Sulphur | 2.5 | Accelerator | 1.2 |
| Accelerator | 0.5 | Antiozonant | 1.0 |
| Antiozonant | 2.0 | | |
| Press cured 18 min. at 153° C. | | Press cured 30 min. at 153° C. | |

The ozone tests were carried out using a 2 mm. thick sheet in tension at 20% elongation and an ozone concentration of 20 parts in $10^8$. The results are given in Table I, a scale of 0–10 being used to indicate complete destruction.

TABLE I

| Time | Natural Rubber Mix | | | | S.B.R. Rubber Mix | | | |
|---|---|---|---|---|---|---|---|---|
| | Antiozonant | | No antiozonant | | Antiozonant | | No antiozonant | |
| Static Test: | | | | | | | | |
| 45 hours | No cracks | | Cracking over whole area value. | 5 | Slight cracking | 2 | Bad cracking | 4 |
| 93 hours | Edge cracks | 2 | ___do___ | 6 | ___do___ | 2 | ___do___ | 8 |
| 220 hours | Cracks all over | 3 | ___do___ | 9 | | | | |
| 244 hours | ___do___ | 4 | Destroyed | 10 | | | | |
| Dynamic Test: | | | | | | | | |
| 189 | Edge cracks | 1 | Complete break | 10 | | | | |
| 237 | Cracks all over | 3 | | | | | | |
| 287 | ___do___ | 5 | | | | | | |

Example 3

A sample of 6-morpholino-2,2,4-trimethyl-1,2-dihydroquinoline (I) was incorporated at the 1% level in a black natural rubber vulcanizate and tested for oxygen resistance by ageing in an oven at 100° C. Comparative figures are given for a known antioxidant, N-isopropyl-N-phenyl-p-phenylenediamine (II). The results of the percentage retention of tensile properties are given in Table II.

TABLE II

| Property | Antioxidant | | |
|---|---|---|---|
| | None | I | II |
| Tensile strength: | | | |
| 2 days | 41 | 80 | 63 |
| 4 days | 24 | 48 | 38 |
| Elongation: | | | |
| 2 days | 63 | 78 | 61 |
| 4 days | 40 | 45 | 44 |

What I claim is:

1. A crystalline compound of the formula:

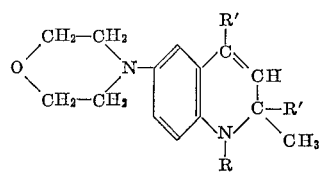

wherein R is selected from the group consisting of hydrogen and lower alkyl radicals and R' is a lower alkyl radical.

2. The crystalline compound 6-morpholino-2,2,4-trimethyl-1,2-dihydroquinoline.

References Cited by the Examiner

UNITED STATES PATENTS

| | | | |
|---|---|---|---|
| 2,713,047 | 7/1955 | Beaver et al. | 260—288 |
| 2,759,936 | 8/1956 | Speeter | 260—247.5 |
| 2,767,179 | 10/1956 | Cavallito et al. | 260—247.5 |
| 2,805,212 | 9/1957 | Beaver et al. | 260—45.8 |
| 2,832,749 | 3/1958 | Harris | 260—45.8 |

ALEX MAZEL, *Primary Examiner.*

DONALD E. CZAJA, HENRY R. JILES, *Examiners.*

M. J. WELSH, J. TOVAR, *Assistant Examiners.*